US006889224B2

(12) United States Patent
Smith

(10) Patent No.: US 6,889,224 B2
(45) Date of Patent: May 3, 2005

(54) METHOD FOR STORING, ACCESSING EMBEDDED WEB PAGES DURING MANUFACTURING PHASE ON PERSONAL DIGITAL DEVICE

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 09/859,025

(22) Filed: May 16, 2001

(65) Prior Publication Data

US 2002/0174110 A1 Nov. 21, 2002

(51) Int. Cl.[7] .............................................. G06F 17/30
(52) U.S. Cl. ........................ 707/10; 707/3; 707/104.1; 715/501.1; 715/513; 705/14
(58) Field of Search .................... 707/1–10, 100–104.1; 715/501.1, 513, 526, 902; 709/203–238, 240–248; 705/1–30; 455/433, 435, 422, 406, 426; 345/766, 326, 348, 333, 357, 329; 379/88.17–88.18, 88.12–88.15; 235/472.01–472.02

(56) References Cited

U.S. PATENT DOCUMENTS

| 5,664,110 A | | 9/1997 | Green et al. ................... 705/26 |
| 5,797,089 A | * | 8/1998 | Nguyen ....................... 455/403 |

(Continued)

FOREIGN PATENT DOCUMENTS

| WO | WO 00/69180 | * | 11/2000 | | |
| WO | WO 01/22749 | * | 3/2001 | ...................... | 7/20 |
| WO | WO 01/27829 | * | 4/2001 | ..................... | 17/60 |

OTHER PUBLICATIONS

Heikki Ailistp et a;, "Realising Physical selection for mobile devices", this paper was presented at Physical interaction workshop on real world users interfaces, a workshop at the mobile HCI conference Sep. 8, 2003, 5 pages.*
Hassan Alam et al., Web document manipulation for small screen devices: A review, BCL technologies Inc. pp. 33–36.*
Tom Worthington FACS, "Issues in the wireless internet", for The art and science of computing (COMP2800/COMP3800). 2 ap 2001, 8 pages.*
Eldar Murtazin, Apr. 2001 mobile digest: Technollogies and communications Part 112 pages.*
Sreenivas M.Kumar, Sharing of distributed data across personal digital assistants, Apr. 17, 1998, pp 1–5.*

*Primary Examiner*—Srirama Channavajjala
(74) *Attorney, Agent, or Firm*—Moser, Patterson & Sheridan LLP

(57) ABSTRACT

A method for accessing remote information via a personal digital device, the method including the steps of storing embedded information in a memory of the personal digital device, receiving an information query from a user of the personal digital device, and determining if a response to the information query is contained in the embedded information. If the response to the information query is contained in the embedded information, then the embedded information is displayed to the user. Alternatively, if the response to the user query is not found in the embedded information, then a remote information query is executed through a wireless communication device. Additionally, if a remote information query is executed, the method includes the step of storing parameters representing the information query.

24 Claims, 2 Drawing Sheets

U.S. PATENT DOCUMENTS

| | | | |
|---|---|---|---|
| 5,864,846 A | * 1/1999 | Voorhees et al. | 707/5 |
| 5,964,830 A | 10/1999 | Durrett | 709/200 |
| 5,964,836 A | * 10/1999 | Rowe et al. | 709/221 |
| 5,974,461 A | 10/1999 | Goldman et al. | 709/224 |
| 5,978,841 A | 11/1999 | Berger | 709/217 |
| 5,999,912 A | * 12/1999 | Wodarz et al. | 705/14 |
| 6,018,724 A | * 1/2000 | Arent | 705/44 |
| 6,026,007 A | 2/2000 | Jigour et al. | 365/51 |
| 6,038,595 A | 3/2000 | Ortony | 709/218 |
| 6,041,045 A | 3/2000 | Alterman et al. | 370/313 |
| 6,070,148 A | 5/2000 | Mori et al. | 705/26 |
| 6,073,173 A | 6/2000 | Bittinger et al. | 709/224 |
| 6,088,730 A | 7/2000 | Kato et al. | 709/227 |
| 6,094,649 A | * 7/2000 | Bowen et al. | 707/3 |
| 6,104,334 A | 8/2000 | Allport | 341/175 |
| 6,185,585 B1 | * 2/2001 | Sequeira | 715/513 |
| 6,216,158 B1 | * 4/2001 | Luo et al. | 709/217 |
| 6,332,127 B1 | * 12/2001 | Bandera et al. | 705/14 |
| 6,473,609 B1 | * 10/2002 | Schwartz et al. | 455/406 |
| 6,493,758 B1 | * 12/2002 | McLain | 709/227 |
| 6,507,762 B1 | * 1/2003 | Amro et al. | 700/83 |
| 6,625,581 B1 | * 9/2003 | Perkowski | 705/27 |
| 6,636,863 B1 | * 10/2003 | Friesen | 707/102 |
| 2001/0049624 A1 | * 12/2001 | Uyama et al. | 705/14 |
| 2002/0095445 A1 | * 7/2002 | alSafadi et al. | 707/517 |
| 2003/0147812 A1 | * 8/2003 | Ueberle | 424/9.52 |
| 2004/0064446 A1 | * 4/2004 | Fujimura | 707/3 |
| 2004/0128614 A1 | * 7/2004 | Andrews et al. | 715/501.1 |

* cited by examiner

METHOD FOR STORING, ACCESSING EMBEDDED WEB PAGES DURING MANUFACTURING PHASE ON PERSONAL DIGITAL DEVICE

BACKGROUND OF THE INVENTION

1. Field of the Invention

The invention relates to Internet enabled personal digital devices. More particularly, the invention relates to selectively storing Internet related information on a personal digital device in order to shorten the Internet response/query time of the device while also increasing user exposure to selected Internet sites.

2. Background of the Related Art

The advancement of communications systems, and in particular cellular-type communications networks, has brought portable telecommunications capability to countless subscribers throughout the world. Although the cellular-type communications networks are primarily used for person to person voice transmissions, there is a growing trend to utilize the cellular-type communications networks to support data transfer operations between a remote computer and a portable computing device.

One example of a technology area that is capitalizing on the portable computing capabilities provided by cellular-type telecommunications networks is personal digital assistant-type devices. A personal digital assistant (PDA) is generally a compact portable electronic processor and memory configuration that is configured to perform specialized operations. PDAs are commercially available in various models and configurations designed to meet various user-specific needs. For example, portable message pads, palm top computers, handheld information organizers, portable digital assistants, and handheld digital processors, along with other publicly available electronic devices, are all PDA-type devices designed and configured with specific capabilities.

Additionally, these types of devices are currently being manufactured with built-in cellular based communications systems, as well as being retrofitted to interact with external cellular communications devices, such as a cell phones and portable modems. Therefore, current PDAs may include the ability to bi-directionally interact with the Internet through a cellular and/or radio link. The cellular and/or radio link generally communicates with a Public Switched Telephone Network (PTSN), which may communicate with the various computers, servers, networks, and/or other computer devices that form the Internet. Therefore, the link allows the PDA to transmit data to and from various Internet sites and/or other computer networks in communication with a PTSN.

Although Internet enabled portable computing devices and service providers are generally available to the public, the efficiency of current Internet enabled portable computing devices and services, and in particular the bandwidth available for the link portion of the data transmission, is substantially slower than that provided by conventional PTSN based services. The smaller available bandwidth and lower data transmission rates substantially affects the performance of Internet enabled PDAs, as the time required to uplink a user query to the Internet as well as the time required to download responses to user queries from the Internet is substantially slower than PTSN based services.

Despite the differential between the data transmission rate of conventional PTSN systems and current mobile cellular-based systems, there is a substantial demand for the flexibility offered by the portable cellular-based systems. As such, various Internet sites, advertisers, and other interested parties are attempting to establish services designed to facilitate use of the cellular-based systems. However, given the vast quantity of information available on the Internet, it is extremely difficult to lure cellular-based users to any specific Internet site. This causes a fundamental problem, as the majority of Internet sites are funded primarily through advertising revenue generated by posting advertisements on the respective Internet sites. Therefore, if a sufficient number of cellular-based users are not viewing an Internet site designed to cater to those specific users, it stands to reason that the advertising dollars will diminish and the Internet site will eventually dissolve.

Therefore, there exists a need for an apparatus and/or method for optimizing the data transmission process in Internet enabled PDAs. Furthermore, there exists a need for an apparatus and/or method for increasing user exposure to selected Internet sites related to the PDA and/or services associated with the PDA.

SUMMARY OF THE INVENTION

Embodiments of the present invention provide a method for accessing remote information via a personal digital device, the method including the steps of storing embedded information in a memory of the personal digital device, receiving an information query from a user of the personal digital device, and determining if a response to the information query is contained in the embedded information. If the response to the information query is contained in the embedded information, then the embedded information is displayed to the user. Alternatively, if the response to the user query is not found in the embedded information, then a remote information query is executed through a wireless communication device. Additionally, if a remote information query is executed, the method includes the step of storing parameters representing the information query.

Embodiments of the present invention further provide a method for accessing an Internet web page on a personal digital device, wherein the method includes the steps of determining if a response to a user query resides within embedded information stored in the personal digital device, and displaying the embedded information to the user if the response is determined to reside in the embedded information. The method further includes executing a remote information query process through a wireless communication device if it is determined that the response to the user query does not reside in the embedded information, and updating the embedded information in accordance with a user query history.

Further still, embodiments of the present invention provide a method for presenting advertising content to users of personal digital devices, wherein the method includes the steps of storing predetermined web page content in a memory of a personal digital device and searching a query database representing the predetermined web page content for a match to a user query. If a match to the user query is found in the query database, then the embedded web page information may be displayed to the user and/or utilized by the personal digital device. Alternatively, if a match to the user query is not found within the query database, then the method includes the steps of executing a remote search process and updating the predetermined web page content with information corresponding to remote search process parameters.

BRIEF DESCRIPTION OF THE DRAWINGS

So that the manner in which the above recited features and embodiments are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
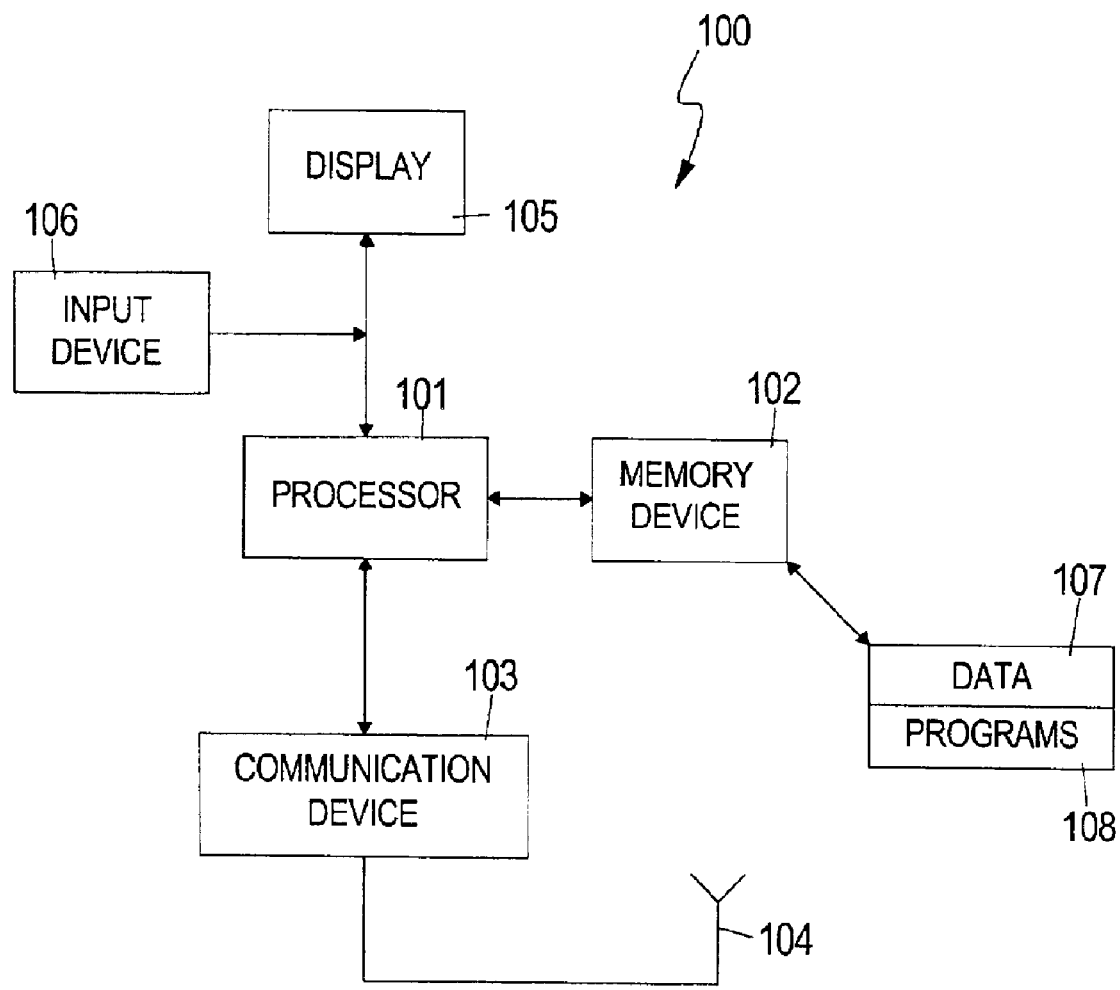
FIG. 1 illustrates a general schematic of a conventional PDA.

A conventional PDA 100, as illustrated in FIG. 1, may contain one or more memory storage devices 102 that permit the creation of various databases 107 therein and that may be used in PDA operations. Additionally, storage/memory device 102 may also be used to store program information 108, which may support various operations of PDA 100. The program information 108 may be read from memory 102 and executed by a processor 101 on-board PDA 100. Processor 101 may receive user input data and/or instructions from an input device 106. The output of PDA 100 may be displayed to the user on a display device 105, such as a portable computer screen. Additionally, the display device 105 may be configured to receive user input, for example, through a touch screen-type device configuration, which may also be transmitted to processor 101.

Processor 101 may further be configured to receive input data and send output data to and from a communications device 103. Communications device 103 may be, for example, a radio and/or cellular communication device configured to transmit and receive data between PDA 100 and a remote computer/location. The transmission of the data and/or information via the communication device often involves transmitting a signal from the communications device 103 in the PDA to a proximate receiving tower. The receiving tower then utilizes a connection to a PTSN to transmit the received information to the appropriate computer network, whether that network is the Internet or a private computer network in communication with a PTSN. Generally, a cellular communications device 103 will transmit and receive data through an antenna 104 in electrical communication with the communication device 103. In this configuration, the communications device 103 may operate in similar fashion to a modem for a personal computer, while PDA 100 operates in similar fashion to the processor and memory configuration of a personal computer.

In operation, PDA 100 may be used to store and recover data from local memory device 102. For example, the user may input information representing contact information for multiple parties into PDA 100, which may then be stored in memory device 102 as a contact information database. Thereafter, the user may search through the contact information database within memory 102 for specific contact information via a query/searching program, which may also be stored within memory 102 and executed by processor 101. As such, PDA 100 may be used to store and selectively recover data for use in various applications.

Processor 100 may further be configured to execute various programs stored within memory 102. For example, programs configured to organize data, search data, interact with users, calculate parameters, along with other general tasks, may be stored in memory 102 and executed by processor 101 at the users request.

Additionally, communications device 103 may be used in conjunction with a query program executed by processor 101 to send a local query, i.e., a query generated on the PDA, to a remote database, such as the Internet, for example, via a wireless communication process. However, this process generally includes PDA 100 having the appropriate software and/or firmware to properly interpret the search request/commands, carry out a search algorithm calculated to generate a desired result to the search, and display one or more records that correspond to the search criteria. However, this process generally requires a substantial portion of overhead from the PDA, Le., processor, memory, and communications link bandwidth, for example. Therefore, in view of the limited bandwidth available to portable PDAs as a result of the physical characteristics of the cellular and radio based communications links, the query/search process is generally modified to execute a more simplified search that is calculated to utilize less bandwidth of the communication link, as well as to minimize processor overhead on the PDA.

In an embodiment of the present invention, the query process of a PDA may be further modified in order to minimize the bandwidth used in executing a query over a wireless communication link. In particular, an embodiment of the present invention utilizes embedded web pages in a personal digital device, such as a hand-held computer, Internet enabled cellular phone, or other portable computing device in order to process these embedded web pages in a method that provides several advantages over conventional search techniques.

With particularity, the implementation of embedded web pages into an Internet enabled PDA allows the PDA to receive automatic updates provided through the available wireless communication device from a master web page. Additionally, the implementation of embedded web pages allows for the adaptation of local, i.e., stored on PDA, web content. This operates to maximize the local storage of information useful to the user of the PDA, while also minimizing the need to access remote web page data or information. The minimization of accesses to remote web content substantially increases performance of the PDA, as the access time associated with local embedded web content is substantially less than the time associated with accessing remote web content via a wireless communication link. Further, since storage requirements for image related data may utilize substantial memory overhead on the PDA, the implementation of embedded web content may also include a process of controlling the storage requirements for image data by storing sub-sampled images. These locally stored sub-sampled images may then be refined, i.e., refreshed from a remote web page, as required.

Embedded web pages on a PDA may also be used to provide automatic feedback to a host of the locally stored information, i.e., a host that provides the information for the embedded web pages on the PDA, such as, the manufacturer of the PDA or the supporting software installed thereon. This automatic feedback may be used to ensure that the local data meets certain requirements, such as, whether the local data is current and optimally distributed based upon the users past query/search history. Therefore, the locally embedded web pages may be dynamically updated by a host web page in accordance with the users historical usage habits. Additionally, since the locally embedded web pages may generally represent information that is frequently presented to the user of the PDA, the locally embedded information may be encrypted to prevent tampering. The encryption, for example, may operate to prevent a host competitor from replacing the original host information with replacement information not generated by the original host information provider that will be frequently viewed by the user. This process operates to ensure the PDA service providers that their Internet and/or web content will be viewed by the user of the PDA, which facilitates revenue generation for the PDA service provider through, for example, advertising sales on the PDA related sites.

Therefore, through the use of locally embedded web pages, embodiments of the invention primarily solve the problem of how to provide rapid access to Internet searches via a PDA while minimizing delays resulting from network traffic and/or bandwidth limitations. As such, in operation, a PDA utilizing an embodiment of the present invention generally includes pre-stored Internet related information within locally accessible memory on the PDA. Therefore, when the user executes a search command, the PDA may first determine if the search command corresponds to a locally embedded web page. If the search command corresponds to a locally embedded web page, then the content of the embedded web page may be presented to the user without the PDA executing the search on the Internet via a communications link. If the PDA determines that the search command is not represented in locally embedded pages, then the PDA may execute the search command on the Internet, or another desired network, via a wireless communications link from the PDA to the desired network.

Additionally, in the situation where the user of a PDA executes a search command that is determined not be represented by locally embedded content, i.e., when the PDA executes a search command through the communications link on a remote network such as the Internet, then an embodiment of the present invention may further operate to record the search command for use in determining the need for additional locally embedded web content. For example, when the user executes a search command that is not represented by locally embedded content, then the PDA may be configured to store the search command in a local database. This database may be periodically transmitted to the host service provider for analysis of the frequency of various search commands that are not represented by the PDA's locally embedded content. This analysis may be used to generate additional locally embedded web pages for the PDA, which may be transmitted to the PDA through the communications link and/or downloaded to the PDA through other known means. Alternatively, firmware on the PDA may be configured to conduct the analysis and page generation operations locally without involvement of the host service provider. In either situation, embodiments of the present invention operate to monitor search commands executed on the PDA so that the locally embedded content may be periodically modified and/or replaced in order to optimize the most frequently executed search requests on the PDA.

An example of an embodiment of the invention may be an IBM Hand-held device that includes PDA and cell phone functions. This product, which may be generally marketed as an Internet enabled PDA, may be sold with a subset of IBM's Internet web site information, i.e. web pages, stored in a memory module of the PDA. The memory module may be a flash-type memory, an IBM microdrive, or other type of memory suitable for use in handheld-type devices. Since a typical page of text requires an average of 10,000 bytes of data, it is possible using current 1,000,000 byte flash memory modules to store over 100 pages of text. Therefore, flash memory modules are an attractive memory option for Internet enabled PDAs. The locally stored Web pages may be pre-compiled by the source or host provider, which would be IBM in the present example, and installed on the PDA at the manufacturing and/or programming stage.

Therefore, when the user of the IBM handheld enters a search for information using the wireless Internet service provider associated with the Internet enabled PDA, for example, the search words may first be indexed against the terms corresponding to the locally stored web pages in memory of the PDA. If the search terms are found in the locally embedded web content, then the locally embedded content may be presented to the user in substitution for executing the search request over the wireless communication medium on the Internet. If the search terms are not found, then they may be sent out via a wireless connection device in communication with the PDA and/or built into the PDA to the Internet. The results may then be communicated back to the PDA via the wireless communications medium and displayed to the user. Additionally, if the search terms are in fact sent out via the wireless communications medium, then the PDA may also store the search terms locally on the device or on another computer. In that way, frequent search misses, i.e. searches that are not found during the local indexing process, may be stored and analyzed in order to determine if additional web page content should be downloaded from the Internet and added to the locally embedded web pages stored on the PDA.

Embodiments of the invention may be particularly applicable to business interests. For example, IBM might sell its PDAs and PDA—cell phone portable devices at a lower price than competitors. However, these devices may be preprogrammed with locally stored IBM web pages, which include popular keywords. As such, consumers may purchase IBM's more economical PDA, and IBM may recover revenue lost through sales of the PDAs at lower prices through selling advertising on the web pages that are locally embedded into the PDA, as these pages will be frequently viewed by the user of the PDA. Therefore, the lower sales price of the PDA may be offset by the expected increased advertising revenue generated from the users of the PDAs seeing IBM's web information first and/or more frequently than other information providers as a result of the PDA first searching the locally embedded information.

Since the locally embedded content has a direct affect upon what content the user of the PDA is regularly exposed to, some additional features of the locally stored may be incorporated. For example, embodiments of the present invention may encrypt the locally stored data so that it is not easily changed or replaced by parties other than the original information provider. This may prevent tampering by competitors that desiring to tap into the advertising market available to the original information provider, which is IBM in the present example, by replacing and/or modifying the original locally embedded web page information. The PDA may also include a cyclic redundancy check, parity check, and/or other means and/or devices that may be used to ensure that the locally stored web data is valid prior to being presented to the user. Therefore, if an IBM competitor were successful in replacing IBM's locally embedded information with his or her own information, then the PDA would be capable of simply not displaying that information to the user, thus negating any competitive advantage obtained by the competitor by modifying IBM's original information. Additionally, the locally stored web data may be linked to certain operations that are normally provided on a PDA. For example, if a wireless connection to the PDA is not possible, i.e., if the wireless link is broken or the PDA is in a dead zone, then the local Web page data may be displayed so that when wireless communication is regained, items of interest selected from the local Web pages may then be transmitted to a host.

Figure 2:
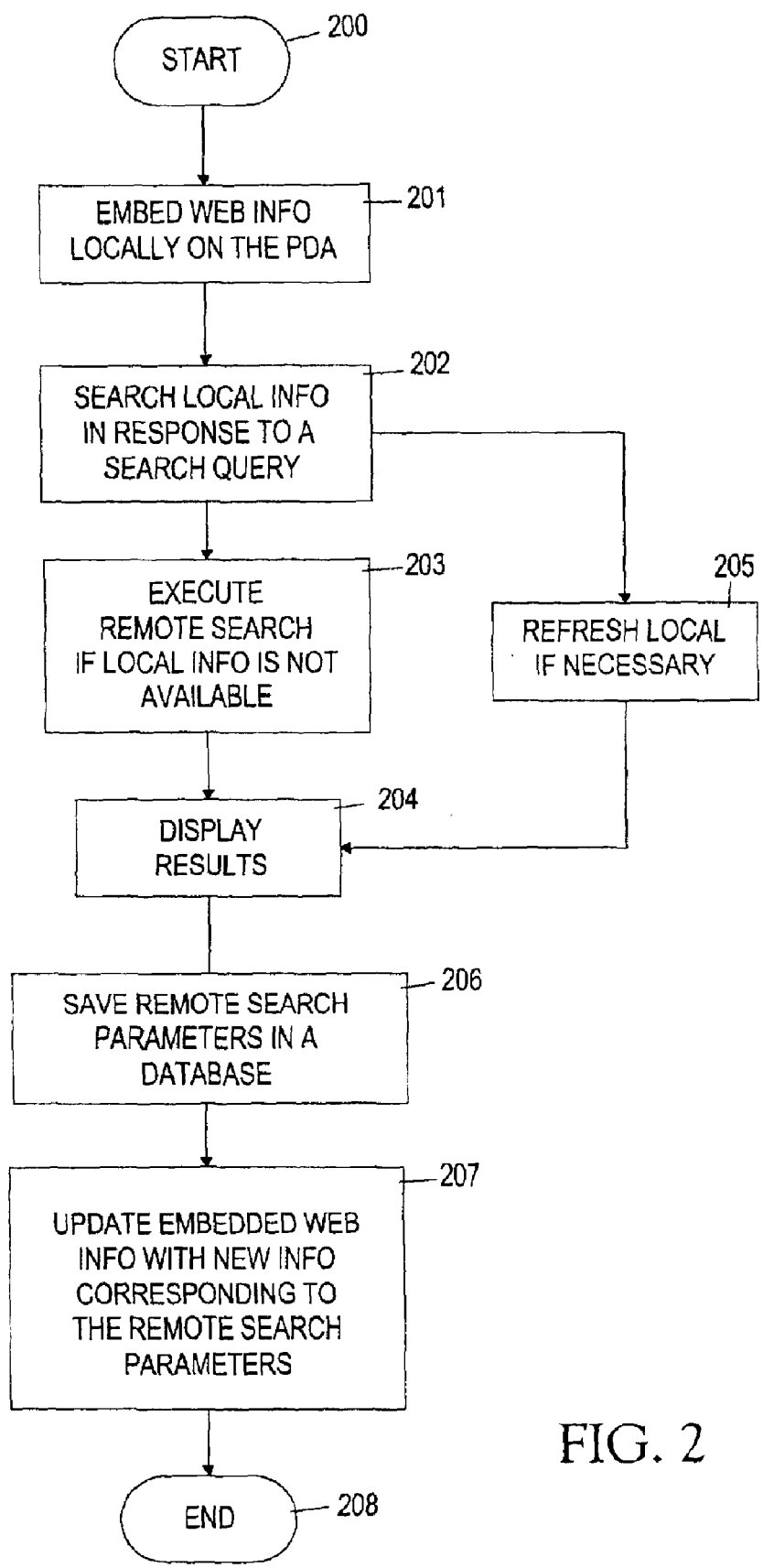
FIG. 2 illustrates an exemplary flowchart of a method of the invention.

FIG. 2 illustrates a general flowchart of an exemplary method of an embodiment of the present invention. The exemplary method begins at step 200 and continues to step 201. At step 201 an Internet enabled PDA is programmed to include embedded web content/information. This programming may include storing embedded web pages and/or information in a memory device resident on the PDA. Once the locally embedded web content is programmed and/or stored on the PDA at step 201, the method continues to step 202. At step 202 the user of the PDA enters a search or query. The search is processed by the PDA in a specific manner calculated to minimize bandwidth utilization as well as to maximize selected advertisers exposure. This process includes indexing into local database having information stored therein representing the embedded web content stored locally on the PDA. If the indexing operation yields a locally embedded web page or content that corresponds to the search request, then the method continues to 205, where the locally embedded web content may be refreshed. This process may be used to update portions of the information to reflect current data. For example, the locally embedded web page may include 90% of the most current information. However, 10% of the information may be outdated. Therefore, the refresh operation of the present exemplary method may include a process for updating the outdated portion of the data, i.e., the 10% of information, with current information without updating the 90% of the information that is still current. This process, as is generally known in the art, may include conducting a comparison between the locally embedded information and current information, and thereafter, downloading only the necessary current information. Alternatively, the embedded web pages may include designated fields that are to be refreshed when it is known that particular fields will require refreshing. Once the refresh operations are complete, the method continues to step 204 where the results of the search are presented to the user of the PDA. Further still, the refreshing process may include refreshing sub-sampled images. For example, in the interest of conserving the limited memory space on the PDA, sub-sampled images of a lesser resolution may be stored on the PDA for viewing by the user. If the user desires to view the images with additional resolution, then the PDA may refresh the sub-sampled image via the wireless communications link. However, the sub-sampled embedded web page allows the user to preliminarily view the image without executing a remote search or query and encountering the delay associated with executing the remote query.

Returning to step 202, if the process of indexing into the database to determine if a corresponding embedded web page exists locally determines that no local web page is available, then the method continues to step 203. At step 203 the method formulates and executes a remote search request corresponding to the PDA user's search query. The search request may be sent to a remote network, such as the Internet or other open remote network capable of resolving/addressing the search request, for example, for processing. Alternatively, the search request may be sent to a closed network, such as a corporate or private network through a secure connection. Regardless of the type or location of the network and/or system receiving the remote search request, the remote search request is generally transmitted from the PDA to the remote network via a wireless communications medium. For example, cellular, radio, and/or other wireless communication based systems may be integrated into the PDA for handling of the transmission of search requests. The particular wireless communications medium and/or device may be generally configured to communicate the search request from the PDA to a PTSN. However, if direct access to the desired information is available, then the communication device may be configured to connect directly to the desired information source without utilization of a PTSN. Once the connection is made, then the results of the search may be transmitted back to the PDA via the wireless communications medium and displayed to the user ate step 204.

Once the results of the remote search are displayed to the PDA user at step 204, the method continues to step 206, where a search criteria storing operation is conducted. More particularly, when the user of the PDA enters a search that cannot be processed via the locally embedded web page information, a remote search request must be sent. Embodiments of the present invention, therefore, may store parameters corresponding to the search requests that were processed remotely, as indicated by step 206. The stored information may be, for example, stored in a query history database either on board the personal digital device, or alternatively, transmitted to a host server in predetermined time increments. This information, whether stored locally or remotely, may then be analyzed to determine if the locally embedded web page information on the PDA should be revised and/or modified to include web page information corresponding to one or more of the remotely executed search requests, as shown in FIG. 207. Thereafter, the exemplary method is completed at step 208.

For example, if the user of the PDA executed several searches for a particular term, then it may be beneficial to modify locally embedded web pages to include a web page corresponding to the particular term. Thus, the next time the user executes a search request with that particular term, the PDA will have the results already present in a locally embedded web page. This results in the processing time for search requests being substantially reduced, as web pages and/or search requests that are frequently visited may be stored locally to avoid repetitious accesses to these results.

In operation, the process of storing previous search parameters and updating the locally embedded web content on the PDA may be undertaken in many ways. For example, each remote search request may be stored on the PDA, and periodically, this information may be transmitted to a host computer. The host computer may be configured to analyze the history and frequency of the search requests and determine if additional embedded web pages should be added to the PDA. If additional embedded web pages are required, then the host computer may generate and transmit additional and/or substitute web pages to the PDA. These web pages may then be stored in memory in the PDA as an embedded web page. However, as noted above, the process of storing and/or replacing embedded web page data on the PDA may be subject to several security processes, so that it is unrealistically difficult for competitors of the host computer/programmer to replace host generated web content with their own content.

Alternatively, the PDA may be provided with firmware capable of analyzing the remote search requests and locally modifying the embedded web page material of the PDA. In this configuration, the PDA will generally operate in similar fashion to the remote update-type embodiment, in that the PDA will generally create a database of search terms corresponding to the remotely executed queries. The firmware may then, at predetermined periodic intervals, analyze the database of remotely executed search terms for search terms having a high frequency of occurrence, or other parameters deemed relevant to determining that a search request should be converted into a locally embedded web page on the PDA. For search queries where it is determined that a locally embedded web page is appropriate, the PDA may acquire the information in the particular web pages via the wireless communications link and generate the locally embedded web page.

Therefore, embodiments of the present invention generally utilize an updating operation that is based upon a stored history of search queries, i.e., query misses in the locally embedded web pages. Although conventional technology uses both time based and changing content based (updating when the content of information changes) updating operations, these types of updating operations fails to accomplish the advantages provided by implementing the stored history based updating process.

While the foregoing is directed to the preferred embodiment of the present invention, other and further embodiments of the invention may be devised without departing from the basic scope thereof, and the scope thereof is determined by the claims that follow.

What is claimed is:

1. A method for accessing web pages via a personal digital device, comprising:
   storing one or more embedded web pages in a memory of the personal digital device during a manufacturing phase of the personal digital device;
   receiving an information query from a user of the personal digital device;
   determining if a response to the information query is contained in the one or more embedded web pages;
   displaying at least a portion of the one or more embedded web pages to the user if the response is determined to be contained in the one or more embedded web pages; and
   executing a remote information query through a wireless communication device if it is determined that the response is not contained in the one or more embedded web pages.

2. The method of claim 1, wherein storing the one or more embedded web pages further comprises:
   generating an indexable database representing each of the one or more embedded web pages.

3. The method of claim 2, wherein the indexable database includes entries corresponding to search terms for each indivdual embedded web page.

4. The method of claim 1, wherein determining if a response to the information query is contained in the one or more embedded web pages further comprises indexing into a database of query terms, wherein each of the query terms in the database represents an embedded web page.

5. The method of claim 1, further comprising:
   storing parameters pertaining to the information query if a remote information query is executed; wherein storing parameters pertaining to the information query further comprises storing the remote information query in an indexable database.

6. The method of claim 1, wherein storing the one or more embedded web pages comprises storing lower resolution versions of web pages residing on the Internet.

7. The method of claim 1, wherein the one or more embedded web pages comprises one or more web pages of at least one selected business in an effort to market the selected business by first determining whether user information queries can be satisfied by displaying one or more of the web pages to the user before executing the remote information query.

8. The method of claim 7, wherein the selected business is a manufacturer of the personal digital device.

9. A method for accessing an Internet web page on a personal digital device, comprising:
   determining if a response to a user query resides within the one or more embedded web pages stored in the personal digital device, wherein the one or more embedded web pages were stored to the personal digital device during a manufacturing phase of the personal digital device;
   displaying one or more embedded web pages to the user if the response is determined to reside in the one or more embedded web pages;
   executing a remote information query process through a wireless communication device if it is determined that the response to the user query does not reside in the one or more embedded web pages; and
   updating the one or more embedded web pages in accordance with a user query history.

10. The method of claim 9, wherein determining if a response to a user query resides in the one or more embedded web pages further comprises:
    searching through a database having entries corresponding to the one or more embedded web pages stored on the personal digital device stored therein; and
    retrieving an embedded web page corresponding to the user query.

11. The method of claim 9, wherein executing a remote information query process further comprises:
    transmitting the user query to a remote computer network; and
    receiving a response to the user query.

12. The method of claim 11, wherein transmitting the user query to a remote network further comprises transmitting the user query from the personal digital device to a remote computer network via a wireless communications medium.

13. The method of claim 9, wherein executing a remote information query process further comprises displaying the results of the remote information query to a user.

14. The method of claim 9, wherein the one or more embedded web pages comprises one or more web pages of at least one selected business in an effort to market the selected business by first determining whether user information queries can be satisfied by displaying one or more of the web pages to the user before executing the remote information query.

15. The method of claim 9, further comprising encrypting the embedded information during the manufacturing phase of the personal digital device.

16. The method of claim 9, wherein the one or more embedded web pages comprises advertising content.

17. A method for presenting advertising content to users of personal digital devices, comprising:
    storing embedded web pages in a memory of a personal digital device during a manufacturing phase of the personal digital device, the embedded web pages comprising the advertising content;
    searching a query database representing the embedded web pages for a match to a user query;
    displaying an embedded web page if a match to the user query is found;

executing a remote search process if no match to the user query is found in the query database; and updating at least one of the embedded web pages with information corresponding to remote search process parameters.

18. The method of claims 17, wherein searching the query database further comprises indexing into the query database for an entry corresponding to an embedded web page representing the user query.

19. The method of claim 17, wherein executing a remote search further comprises transmitting the user query to a remote computer network for processing thereon via a wireless communications device in communication with the personal digital device.

20. The method of claim 17, wherein updating at least one of the embedded web pages further comprises:

storing parameters corresponding to each remote search process;

analyzing the stored parameters corresponding to each remote search process to determine parameters occurring with frequency; and updating the embedded web pages with content corresponding to the remote search process to determine parameters occurring with frequency.

21. The method of claim 17, further comprising encrypting the embedded web pages to prevent unauthorized modification of the embedded web pages.

22. A personal digital device, comprising:

a wireless interface for establishing a wireless network connection;

a memory containing embedded web pages stored to the memory during a manufacturing phase of the personal digital device; and a processor configured to perform an operation comprising:

receiving an information query from a user of the personal digital device;

determining whether the information query can be satisfied with the embedded web pages;

if so, displaying at least a portion of the embedded web pages to the user;

and executing a remote information query through a wireless communication device if it is determined that the information query cannot be satisfied with the embedded web pages.

23. The personal digital device of claim 22, wherein the embedded web pages are encrypted during the manufacturing phase.

24. The personal digital device of claim 22, wherein the embedded web pages are of at least one selected business in an effort to market the selected business by first determining whether user information queries can be satisfied by displaying one or more of the web pages to the user before executing the remote information query.

* * * * *